April 28, 1970 W. W. LEE ET AL 3,509,543

OPTICAL MEMORY SYSTEM

Filed April 28, 1964 2 Sheets-Sheet 1

INVENTORS
WALTER W. LEE
THOMAS J. MELORO
BERNARD SPIEKER
ISRAEL L. FISCHER
ENOCH C. ASHENBERG

BY Constantine A. Michalos ATTORNEY

INVENTORS
WALTER W. LEE
THOMAS J. MELORO
BERNARD SPIEKER
ISRAEL L. FISCHER
BY ENOCH C. ASHENBERG
Constantine A. Michalos ATTORNEY United States Patent Office 3,509,543
Patented Apr. 28, 1970

3,509,543
OPTICAL MEMORY SYSTEM

Walter W. Lee, Allendale, Thomas J. Meloro, Jersey City, Bernard Spieker, New Milford, and Israel L. Fischer, Harrington Park, N.J., and Enoch C. Ashenberg, Congers, N.Y., assignors to The Bendix Corporation, Teterboro, N.J., a corporation of Delaware Filed Apr. 28, 1964, Ser. No. 363,085
Int. Cl. G11c *13/04*
U.S. Cl. 340—173 6 Claims

ABSTRACT OF THE DISCLOSURE

A method and means for translating information stored on function tapes to an optical drum such that the information on the tape appears on a different circumferential track of the drum, and the information on each circumferential track is aligned with the information in each other circumferential track.

The invention relates generally to digital computer memory systems and particularly to a method and means for translating binary information from storage devices such as magnetic tapes to an optical memory storage drum.

Heretofore, it has been the practice to use low storage density magnetic memory systems for digital computers. Sophisticated aerospace needs present a problem to the computer memory art, since the storage capacity requirements necessitate a system storage capacity not anticipated or efficiently solved by the present day computers having magnetic storage memory systems. As the program length increases with mission complexity, the common magnetic bulk memory devices cannot handle the storage capacity needed without invalidating the basic needs of an efficient computer having high storage density, fast resolution rate, small size and light weight. In the present day magnetic memory systems, the memory devices that have high storage efficiency have inherently long access time. Conversely, memory devices which have fast random access times have low bit densities and hence poor storage efficiencies. The utilization of the former devices sacrifices computational speed, and therefore, severely limits the operation of the arithmetic unit for the sake of capacity, while the use of the latter, inherently faster devices dictates that large capacity can only be obtained at the price of increased size and weight. The systems became too bulky to be applied to the aerospace field where information storage capacity in the range of one million bits of information may be desired. In addition, the present day magnetic memory drums are unsatisfactory for aerospace use because they have a disadvantage of being sensitive to stray electric and magnetic fields which caused inaccuracies, and therefore produced an unreliable permanent memory storage system.

The solution of the problem lies in providing an optical storage drum used in a digital computer optical memory system which utilizes the combination of the desirable features of high storage efficiencies found in magnetic drums or tapes with the fast random access time found in magnetic core arrays.

Since the aerospace computer system is designed specifically for such intended application, its program, and significant portions of other stored data, are permanent in nature. This permits the substitution of optical techniques for magnetic techniques in design of the storage memory system. The use of an optical drum, which has a much higher packing density and permanent storage, results in a more reliable memory system. Therefore, the optical memory drum can be made smaller in size and weight than its equivalent magnetic counterpart.

The optical memory drum is a glass cylinder having information stored on its surface as clear and opaque areas. A light source inside the cylinder and readheads using photodetectors outside the cylinder are used to read the stored information, such as provided in a copending U.S. application Ser. No. 336,487, filed Jan. 8, 1964 by Lee et al., and assigned to The Bendix Corporation, the same assignee as the present invention.

Optical memory drums have several advantages over magnetic memory drums and other types of information storage devices. The advantages include light weight, small size, high storage efficiency, that is, large capacity per unit volume and per unit weight, fast random access, and insensitivity to stray electric and magnetic fields.

As provided in this invention, an optical drum is manufactured by applying a photographic emulsion to a glass cylinder which in turn is mounted on a rotatable table or indexing device. A light source and a plurality of shutters are positioned in spaced relation to the drum so that light from the light source passes through the shutters and falls on a portion of the sensitive medium on the drum. The drum is rotated in synchronization with the opening and closing of the shutters, and with the operation of the light source so that a pattern is laid down on the photographic emulsion on the surface of the drum. The drum is then processed to fix the pattern on the drum's surface. In manufacturing the drums, two problems have heretofore been encountered.

The first has to do with the sheer quantity of information to be inscribed on the drum. A small drum of two inch diameter would accommodate 4096 bits of information around each circumferential track; and a drum of two and one-half inches in height would accommodate over 200 circumferential information tracks, and contain over 800,000 bits of information in total. To inscribe over 800,000 bits of information on a drum with speed and accuracy requires the use of automatic or semiautomatic equipment with control and verification units.

The second problem associated with preparing an optical storage drum is that the bits of information in one circumferential information track must be lined up with the corresponding bits of information in the adjacent circumferential information tracks. This requirement is called "alignment." The high density of stored information, in which a bit of information may be only .010 of an inch high and .0008 of an inch wide may necessitate the alignment to be done automatically or semiautomatically with the control and vertification units.

Therefore, an object of this invention is to provide a method and means for manufacturing an optical memory drum having automatic or semiautomatic units for efficient and systematic manipulation of the transfer of coded information from magnetic memory tapes to the optical memory drum.

Another object of the invention is to provide a method and means for accurately and quickly transferring information to an optical storage drum and have such information properly aligned on the drum.

Another object of this invention is to provide a system to compress the size of computing and control systems for aerospace missions by applying the techniques of microphotography and microphotoetching to encode stored information Another object of this invention is to provide an optical memory technique for the permanent storage of long programs needed in the computation and control systems of aerospace missions.

Another object of this invention is to provide an optical memory system having a high storage efficiency, fast random access and insensitivity to stray electric and magnetic fields by providing a storage means such as a glass drum, and photographically microphotoetching its surface with encoded information.

A further object of this invention is to provide an optical memory system having a photosensitive glass drum on which can be stored information by means of a programming and indexing system, which system primarily provides for a drum between an optical means, such as a light source, a shutter bank having a plurality of shutters with a predetermined number of them in an open position and a photographic lens.

An additional object of this invention is to provide an optical memory system having a fast solution rate, high packing density, and minimal size and weight.

Another object of the invention is to provide a method and means for translating information stored on function tapes to an optical drum such that the information on a tape appears on a different circumferential track of the drum, and the information in each circumferential track is aligned with the information in each other circumferential track.

A further object of the invention is to provide a means for automatically translating information from one storage device to an optical memory drum and comparing the information on the drum with the information on the original storage device.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

IN THE DRAWINGS

Figures 1, 2, 3:
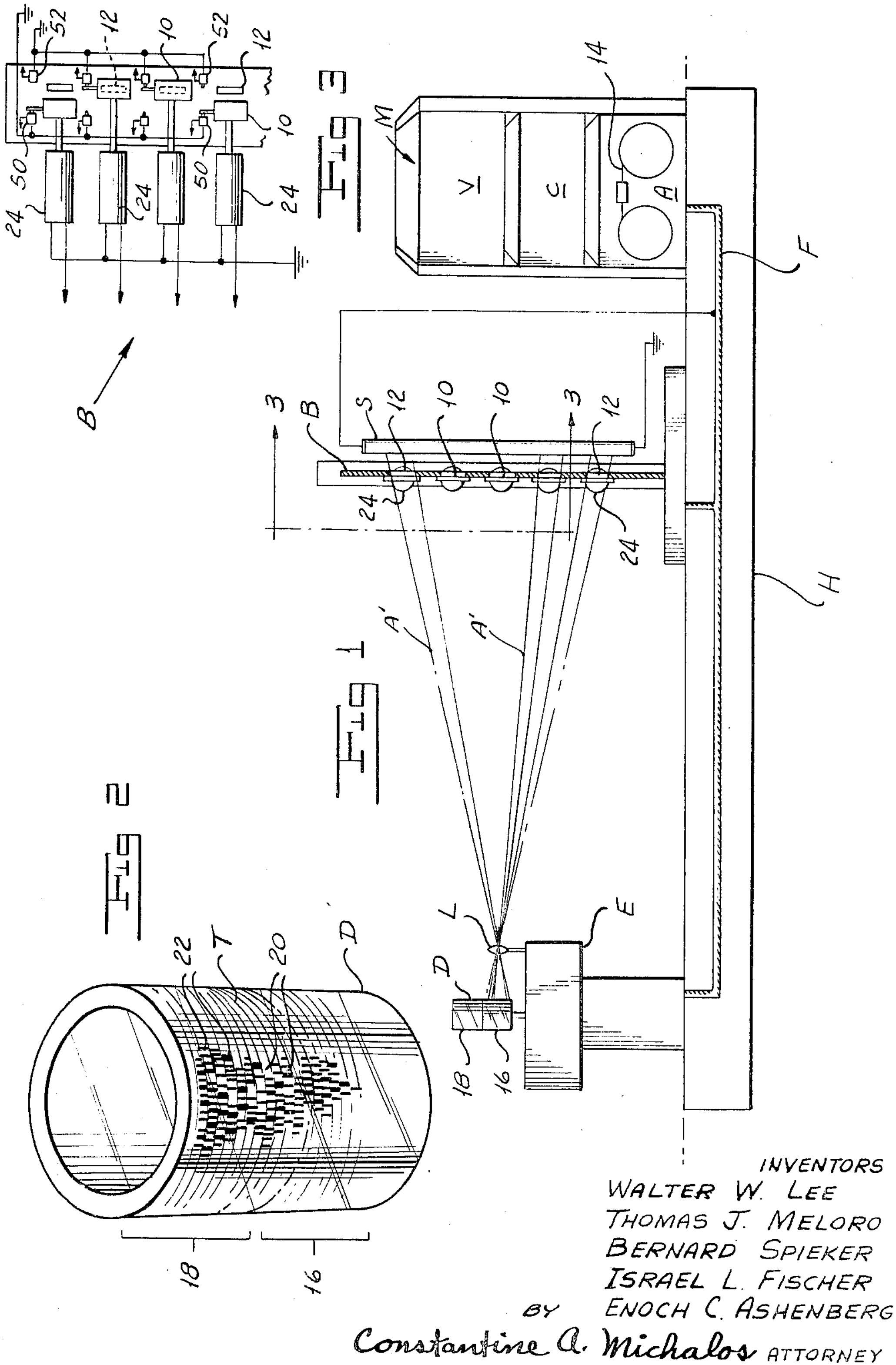
FIGURE 1 shows an elevational schematic view of the optical drum manufacturing system in accordance with a preferred embodiment of this invention.
FIGURE 2 shows an optical glass drum fabricated in accordance with the manufacturing system as shown by the embodiment of FIGURE 1.
FIGURE 3 shows a fragmentary end view of the invention taken substantially along line 3—3 of FIGURE 2.

As shown in the schematic view of FIGURE 1, wherein coded information is microphotographically inscribed on an optical glass cylinder or drum D, the optical drum manufacturing system comprises the combination of a shutter bank B and a drum index unit E, both of which are controlled by a master tape control unit M. The drum index unit E and the shutter Bank are mounted at opposite ends of an optical bench H in order that precise alignment may be achieved and the whole unit kept free from vibration and other disturbing forces.

The drum D in turn is mounted on a spindle within the drum index unit E behind a camera lens L. Interposed between the lens L and a light source S is loacted the shutter bank B which supports an array of 100 shutter units, each unit comprising a shutter leaf 10, a solenoid 24, and two microswitches 50 and 52. The two microswitches 50 and 52 are arranged so that when the shutter 10 is open, that is to say, as shown in FIGURE 3, when the solenoid 24 is deenergized and the shutter leaf 10 fully retracted from the optical path, one microswitch 50 is closed and the other microswitch 52 is open. As soon as the solenoid 24 is energized and the shutter 10 leaves the retracted position, the device is adjusted so that in the process of extending, both microswitches 50 and 52 remain open, the second microswitch 52 only closing when the shutter 24 is fully extended. This provides a necessary check against solenoid malfunction or jamming of the shutter.

Behind the shutter bank B is placed the light source S, which may be a zenon arc type lamp. The light source or lamp S and the shutter bank B are positioned in spaced relation tothe drum D so that a light signal A′ passes through an open aperture 12, as shown in FIGURES 1 and 3, to fall on a portion of the drum D having a sensitive photographic emulsion on its surface. Control of the entire manufacturing system is provided by the master type control unit M which includes a tape reader A, a control unit C and a verification unit V.

The master control unit M provides means to energize the solenoids 24 for actuating the shutter leaves 10 to open or close the aperture 12 on the shutter bank B in accordance with a predetermined signal derived from a coded master information tape 14. In addition, the master unit M, in accordance with signals derived from the master tape 14, controls the drum index unit E and the light source S through a control cable F, as hereinafter more fully described.

The drum D itself is a high precision quality optical piece made of lime glass annealed to remove residual stresses and polished to a required close tolerance. The master tape 14, which may be a magnetic tape or a punched paper tape, is usually a coded information storage tape having information transferred from a plurality of functional tapes.

Information on the master tape 14 is typically organized or worded in steps or set-ups of 100 bits each, where 100 shutters are controlled at one shutter arrangement or set up to produce coded information on an equal number of circumferential information tracks T as shown in FIGURE 2. The bits of information in each frame of the master tape 14 is arranged that the first bit from the first shutter goes onto the first or uppermost track T on the drum D. The second shutter controls the bit of information to be found on the second track and so on down a vertical line, to produce 100 vertical bits of information on the drum D.

Next, the indexing unit E rotates the drum to displace it an incremental amount to a second position for a second simultaneous photograph of 100 bits of information on 100 tracks. This continues until the drum has rotated 360° to provide thereby one half of the transfer of coded information onto the drum on one half portion 16 of the drum D. The second portion 18 of the drum D may be similarly manufactured as the drum portion 16.

Referring to the drawing, FIGURE 2 shows a sketch of the optical glass memory drum D having the plurality of the circumferential information tracks T. The number of circumferential tracks T is limited by the length or height of each bit of information on the tracks T and by the length or height of the drum. Each circumferential track T may contain a predetermined number of bits of information depending on the width of each bit of information and the diameter of the drum. For example, on a two inch diameter drum, each bit of information may be .0008 inch wide. Thus, 4096 bits of information may be located in each circumferential track T. A microphotographic pattern is thus photographed onto the presensitized surface of the glass drum D. The information pattern is such that clear areas 20 and opaque areas 22 are photographically produced by this system and then the drum is processed to fix the pattern on the drum surface. The clear areas 20 and the opaque areas 22 correspond to the "zeros" and the "ones" of the binary system.

Figure 4:
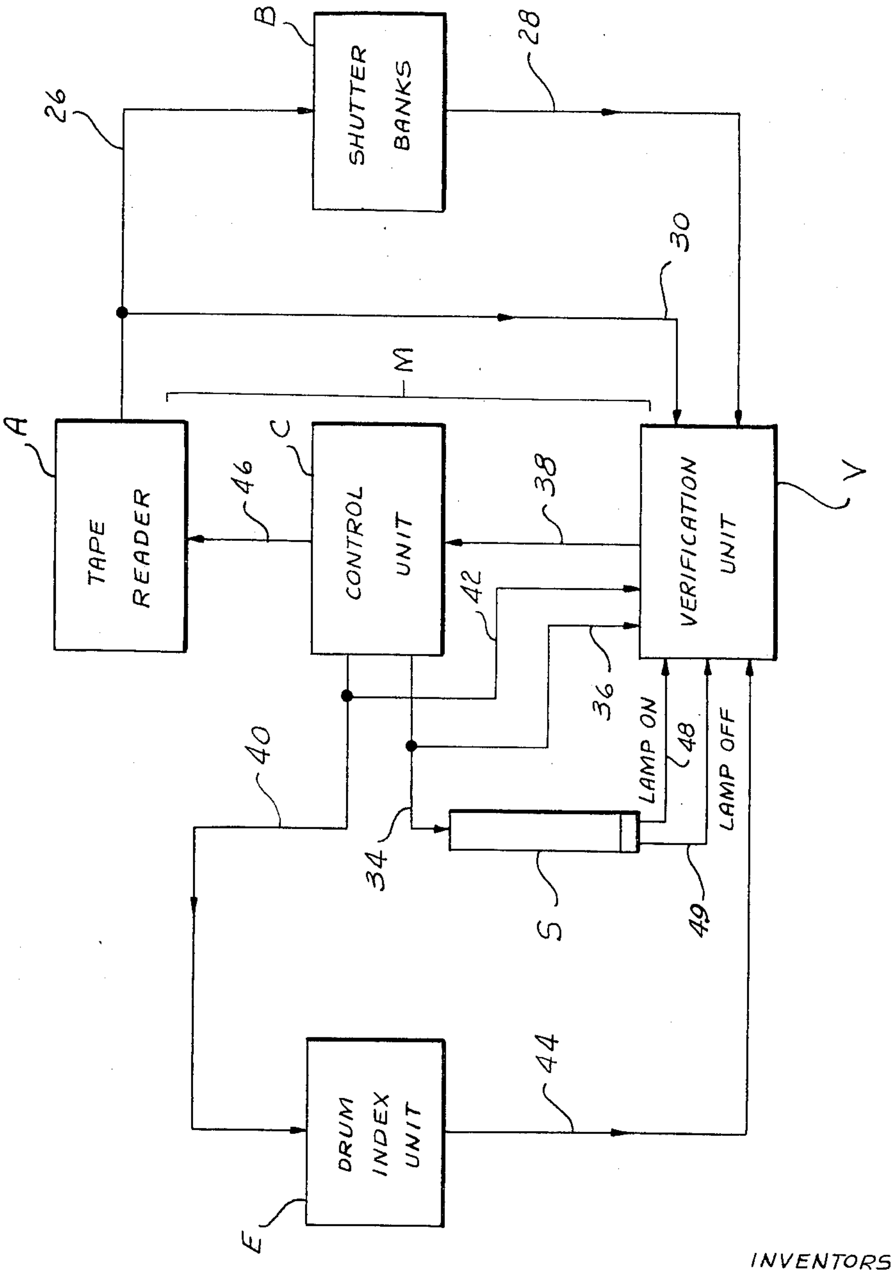
FIGURE 4 shows a block diagram of the optical drum manufacturing system in accordance with the embodiment shown in FIGURE 1.

The block diagram of the invention, as shown in FIGURE 4, provides for an optical drum manufacturing system wherein the master tape 14 is positioned in the tape reader A. Next, the tape reader A reads the information on the master tape 14. The information is transmitted to the solenoids 24 of the shutter bank B, see FIGURE 3, through conductor 26 which sets the shutters 10 to open or close the apertures 12 as commanded by the coded information on the tape 14. All of the 100 shutters are controlled in either an open or closed position. When the shutters 10 are set, closing or opening the corresponding apertures 12 and activating their respective microswitches 50 or 52, the position of the microswitches will be verified. That is, a signal will be sent from the shutters or shutter bank B through conductor 28 to the verification unit V and simultaneously another signal will be sent from the tape reader A to the verification unit V through conductor 30. Should there be a failure to verify, the entire inscription process is immediately halted to determine any malfunction in the system. If both of the signals, one coming from the tape reader directly to the verification unit by conductor 30, and the signal coming from the tape reader by conductor 26 through the shutter bank B to the verification unit by conductor 28 are identical, the verification unit V will send a "go" signal to the control unit C, through conductor 38. The control unit C will then send a command signal to the exposure lamp through conductor 34, and at the same time will send the same signal to the verification unit V through conductor 36. The verification unit V will determine if the lamp S has been lit for the required length of time to complete the predetermined exposure time. If the verification unit V has verified that the lamp S was lit for the desired length of time as required by the process, it will send a "go" signal to the control unit C through conductor 38 that the proper exposure has been made through the uncovered slits 12 to the drum D and, therefore, the drum D may be advanced to the next position. The control unit C will therefore send a signal through conductor 40 to direct the drum indexing unit E to advance the drum D to the next position. Simultaneously, it will send a signal to the verification unit V through conductor 42 which is compared to an output signal of the drum index unit E to the verification unit through conductor 44. If the two signals agree, the verification unit V will send a "go" signal to the control unit C which will in turn command the tape reader A through conductor 46 to advance to its next position, repeating the cycle again. At this point, the cycle will then begin wherein the tape reader sends an electrical signal to the verification unit.

It should be noted that the lamp S will send a signal to the verification unit V through conductor 48 that it is "on," or will send a signal to the verification unit V through conductor 49 that it is "off." This will assure that the photographic emulsion on the surface of the drum D had been sufficiently exposed by the lamp. Upon completion of the transferral of the information from the tape 14 to the shutter bank B to be inscribed on the drum D, for each successive setting, as herein described, the process will be self-repeated until the inscription on half of the drum 16 is complete. The lens L will then be moved relative to the drum D for the exposure of the other half 18 of the drum D. The drum D will then be processed to fix the pattern on the drum surface as illustrated in FIGURE 2, wherein the glass drum is shown having the predetermined bits of information or micro-images microphotographically etched on its surface.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. A means for translating information from a first storage means to an optical memory drum, comprising an information master tape, an optical drum adapted to store the information from said tape in circumferential tracks around its surface, a light source spaced from said drum, a plurality of shutters operable upon a predetermined signal, means for indexing said drum and operating said shutter bank according to a predetermined combination and in accordance to information received from said information master tape, the information of said master tape being arranged such that the information may be transferred in one setting to the different circumferential information tracks and indexing the corresponding settings of information to be arranged along a corresponding length of the information track on said drum.

2. The structure of claim 1 wherein said information is stored on said drum in opaque and clear microphotographic areas denoting the binary system of coded information.

3. An optical drum manufacturing system for transferring information to the optical drum comprising an information master tape, an optical memory drum having a length and a circumference presensitized with photographic emulsion for receiving thereon information stored on said master tape, a light source, a plurality of shutters interposed between said light source and said drum and in spaced relation thereto, control means for reading the information on said master tape and thereby controlling the setting of said shutters depending on the information received from said tape, whereby operation of said control means by said shutters operates to direct the light from said light source to fall onto said drum and to thereby transfer the information from said tape to said drum.

4. A means for translating information to an optical memory drum comprising, a photographically presensitized drum, a storage means having information stored thereon, a reader unit for reading said information, a control unit, a plurality of shutters set by said control unit commanded by the coded information of said reader unit, a source of light spaced from the optical memory drum directing light through the controlled shutters commanded by said control unit for exposing said optical presensitized drum to the light source in accordance to the setup of said shutters, translating the information from said storage means to said drum.

5. The structure of claim 4 further comprising a verification unit for receiving a signal from said shutters to determine if the proper setting has been transmitted to the shutters in accordance with the information received from said reader and for directing said control unit for operating said light source to expose the drum to said light source through said shutters.

6. The structure of claim 5 wherein said shutters comprise a plurality of solenoids, a plurality of shutters leaves operable by said solenoids, said shutter leaves being extendable to cover a plurality of apertures and retractable to uncover said apertures, and a pair of microswitches for each of said shutter leaves, one microswitch at each end of travel of said shutter leaves for determining the position of said shutter leaves upon each setting of the shutters for transmitting the position of said shutter leaves to said verification unit.

References Cited

UNITED STATES PATENTS

| | | | |
|---|---|---|---|
| 2,909,973 | 10/1959 | Koelsch | 340—173 |
| 3,139,319 | 6/1964 | Mellon | 346—107 |
| 3,148,355 | 9/1964 | Sliter | 340—173 |
| 2,708,267 | 5/1955 | Weidenhammer. | |
| 2,807,005 | 9/1957 | Weidenhammer. | |
| 2,872,666 | 2/1959 | Greenhalgh. | |
| 2,921,132 | 1/1960 | Fivel. | |
| 2,955,280 | 10/1960 | Hughes. | |

TERRELL W. FEARS, Primary Examiner

U.S. Cl. X.R.

235—61.11; 340—347; 346—107